Oct. 23, 1923.
E. BOSSI
1,471,822
INTAKE MANIFOLD FOR INTERNAL COMBUSTION ENGINES
Filed Jan. 23, 1923
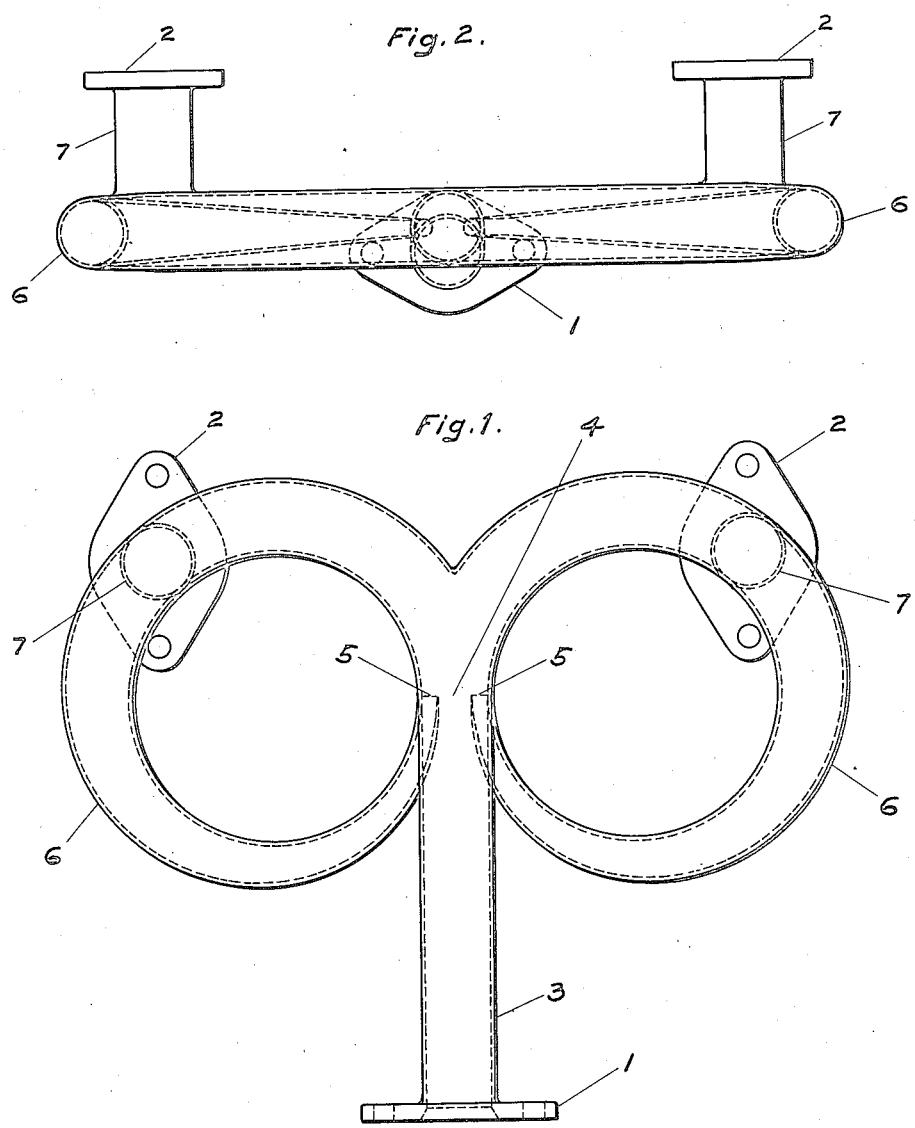

Patented Oct. 23, 1923.

1,471,822

UNITED STATES PATENT OFFICE.

ENEA BOSSI, OF NEW YORK, N. Y., ASSIGNOR TO SELF FEEDING VAPORIZER CORPORATION, OF NEW YORK, N. Y., A CORPORATION OF NEW YORK.

INTAKE MANIFOLD FOR INTERNAL-COMBUSTION ENGINES.

Application filed January 23, 1923. Serial No. 614,431.

*To all whom it may concern:*

Be it known that I, ENEA BOSSI, a subject of the King of Italy, residing at New York, in the county of New York and State of New York, have invented a new and useful Improvement in Intake Manifolds for Internal-Combustion Engines, of which the following is a specification.

The present invention relates broadly to intake manifolds for internal-combustion engines and is especially applicable to engines with self-feeding vaporizers. The principal object of the present invention is an improvement in gasifying the fuel and in distributing the same to the engine cylinders economically.

Another object of the invention is to provide a device of this character, which is interchangeable with the ordinary type of intake manifold and may be installed on any internal-combustion engine to improve the economy.

A still further and important object of the invention is to provide a device of this kind in which an absolutely even mixture is delivered to each of the intake ports of the cylinders.

Realizing that the present invention may be embodied in constructions other than those specifically shown and described I desire that the disclosure herewith shall be considered as illustrative and not in the limiting sense.

Referring to the drawing:

Fig. 1 is a front elevation of the preferred form of the present invention, and

Fig. 2 is a top view of Fig. 1.

Similar numerals refer to similar parts in each of the several views.

In Fig. 1 of the drawing, numeral 1 designates a flange for the attachment of the vaporizer. Flanges 2 are provided to fasten the manifold to the engine cylinders. The mixture from the vaporizer enters the manifold through the tube 3 and increases its velocity at the reduced area 4 of the tube 3, thus providing an increased suction at the small ends 5 of the branch tubes 6. The mixture is drawn into the engine cylinders through the channels 7.

From the foregoing description it is evident, that there is a constant circulation of the gases in the branch tubes while the engine is running, that all superfluous gases are carried away from the outlet channels by this circulation, that the mixture will be better atomized and that a greater economy will result.

What I claim is:

1. In an intake manifold, in combination an intake tube having a restricted area, branch tubes starting and terminating in the said intake tube, and outlet channels connected with the said branch tubes.

2. In an intake manifold, in combination an intake tube, tapered branch tubes starting and terminating in the said intake tube, the small ends of the said branch tubes forming a reduced area in the said intake tube, and outlet channels connected with the said branch tubes.

3. In an intake manifold, in combination an intake tube having a restricted area, branch tubes of suitable shape starting and terminating in the said intake tube, and outlet channels connected with the said branch tubes.

4. In an intake manifold, in combination an intake tube having a restricted area, tapered branch tubes having the form of a spiral and starting and terminating in the said intake tube, and outlet channels connected with the said branch tubes.

5. In an intake manifold, in combination an intake tube having a restricted area, branch tubes starting and terminating in the said intake tube and outlet channels connected with the said branch tubes at suitable angles.

6. In an intake manifold, in combination an intake tube having a restricted area, two tapered branch tubes of suitable shape starting and terminating in the said intake tube, and two outlet channels connected with the said branch tubes at a point where the taper of the said branch tubes begins.

7. In an intake manifold, in combination an intake tube having a restricted area, tapered branch tubes of suitable shape starting and terminating in the said intake tube, the small ends of the said branch tubes terminating parallel to the said intake tube, and outlet channels connected with the said branch tubes at suitable angles.

8. In an intake manifold, in combination an intake tube having a restricted area, tapered branch tubes of suitable shape and tangent to the said intake tube, and outlet channels connected with the said branch tubes at suitable angles.

9. In an intake manifold, in combination an intake tube having a restricted area, tapered branch tubes starting and terminating in the said intake tube and so shaped that the circulating gases will always be forced against the wall of the said branch tubes at the same angle, and outlet channels connected with the said branch tubes.

10. In an intake manifold, in combination an intake tube, branch tubes starting and terminating in the said intake tube, and exit openings in the said branch tubes.

ENEA BOSSI.